United States Patent [19]

Roethig

[11] Patent Number: 4,821,886

[45] Date of Patent: Apr. 18, 1989

[54] CLEANING DEVICE FOR AGRICULTURAL PRODUCTS

[76] Inventor: Hermann F. Roethig, 11 Sluysken Street, Welgemoed, 7530, South Africa

[21] Appl. No.: 171,393

[22] Filed: Mar. 21, 1988

[51] Int. Cl.$^4$ .............................................. B07B 13/00
[52] U.S. Cl. .................... 209/618; 130/5 C; 15/3.11; 209/673
[58] Field of Search ............... 209/617, 618, 667, 669, 209/673, 671; 171/26, 28, 57, 58; 15/3.1, 3.11, 3.2; 56/104, 105; 130/5 C, 5 D

[56] References Cited

U.S. PATENT DOCUMENTS

| 150,196 | 4/1874 | Shunk | 56/104 |
|---|---|---|---|
| 235,038 | 11/1880 | Spear | 56/105 |
| 1,027,013 | 5/1912 | Stowell | 130/5 C |
| 1,155,173 | 9/1915 | Tschantz | 130/5 D |
| 1,663,266 | 3/1928 | Daniel | 130/5 D |
| 1,927,405 | 9/1933 | Johnson | 209/670 |
| 1,980,815 | 11/1934 | McBean | 209/674 X |
| 2,079,201 | 5/1937 | Carpineti | 56/104 |
| 2,547,878 | 4/1951 | Marshall | 171/57 |
| 2,604,206 | 7/1952 | Armer | 209/669 |
| 2,921,426 | 1/1960 | Heth | 171/58 |
| 3,283,895 | 11/1966 | Rollins | 209/669 |
| 3,473,658 | 10/1969 | Bartlett | 209/618 |
| 3,747,149 | 7/1973 | Tatyanko et al. | 209/669 X |
| 3,750,211 | 8/1973 | Zaun et al. | 130/5 C X |
| 3,900,036 | 8/1975 | Anderson et al. | 130/5 D |

FOREIGN PATENT DOCUMENTS

| 1782501 | 3/1973 | Fed. Rep. of Germany | 209/667 |
|---|---|---|---|
| 31846 | 6/1927 | France | 209/669 |
| 209120 | 6/1968 | U.S.S.R. | 130/5 C |
| 1065197 | 4/1967 | United Kingdom | 15/3.2 |

Primary Examiner—Johnny D. Cherry
Assistant Examiner—Gary C. Hoge
Attorney, Agent, or Firm—Larson and Taylor

[57] ABSTRACT

Agricultural products often require cleaning before sorting, packing or further processing. Such cleaning generally includes removing unwanted projections, such as roots, stems, loose leaves, foreign articles sticking thereon, etc. If the cleaning is done manually, it is cumbersome and expensive. The invention provides a cleaning device for agricultural products with at least one pair of rotatable elongated members arranged adjacent and substantially parallel to each other. At least one spiral ridge is provided on one elongated member in each pair; and a complementary associated spiral groove is provided on an adjacent associated elongated member. On rotation of the elongated members projecting parts of agricultural products are gripped between associated spiral ridges and spiral grooves for removal from such products.

4 Claims, 3 Drawing Sheets

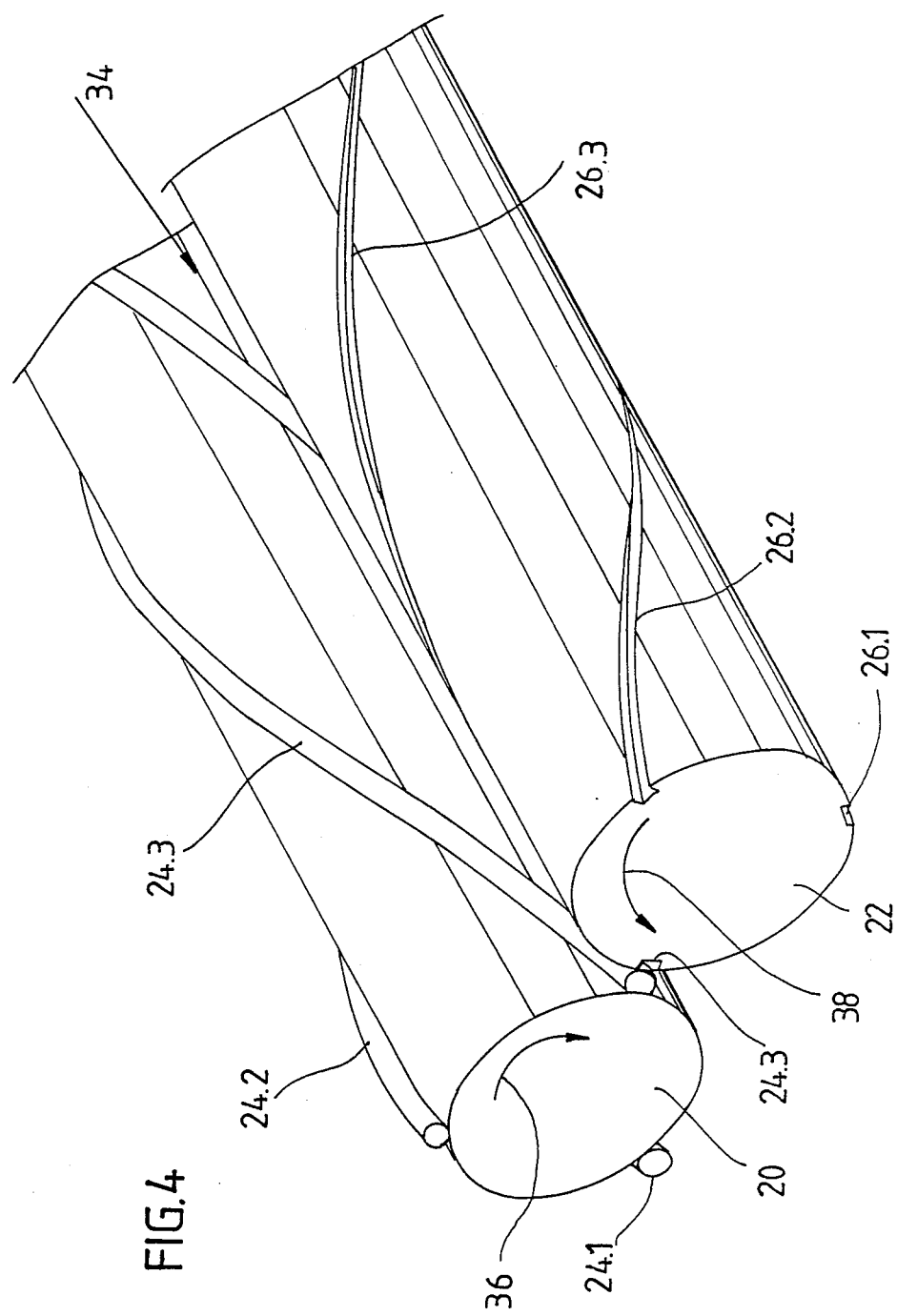

CLEANING DEVICE FOR AGRICULTURAL PRODUCTS

FIELD OF INVENTION

The present invention relates to a cleaning device for agricultural products. Such agricultural products may for instance be onions.

BACKGROUND OF INVENTION

Agricultural products, such as onions, often require cleaning before sorting, packing or further processing. Such cleaning generally includes removing unwanted projections, such as roots, stems, loose leaves, foreign articles sticking thereon, etc.

If the cleaning is done manually, it is cumbersome and expensive.

It therefore is an object of the invention to provide a cleaning device, which is relatively inexpensive to produce and operate and which effectively can clean agricultural products by removing projections, such as roots, stems or loose leaves therefrom.

SUMMARY OF INVENTION

According to the invention, a cleaning device for agricultural products includes a support structure having an upper side and a lower side; at least one pair of rotatable elongated members arranged adjacent and substantially parallel to each other; rotating means for rotating each of the elongated members about its respective longitudinal axis so that in each pair the elongated members are rotated in opposite directions towards each other and towards the lower side of the support structure; at least one spiral ridge provided on one elongated member in each pair; a complementary associated spiral groove for each spiral ridge provided on an adjacent associated elongated member of each pair of elongated members, so that on rotation of the elongated members projecting parts of agricultural products to be cleaned and placed on the elongated members are gripped between associated spiral ridges and spiral grooves for removal from such products; and a strip made of resilient material, such as rubber material, being located in each spiral groove, against which strip the complementary spiral ridge is adapted to abut.

The elongated members may be in the form of elongated cylinders.

Each spiral ridge and each groove of each pair of elongated members may be adapted to cut projections or loose parts from products to be cleaned and placed on the elongated members.

The rotating means may include an electrical motor adapted to drive the elongated members with the ridge or ridges and all pairs of elongated members and its associated cylinder with the groove or grooves in turn may be driven by the cylinder with the groove or grooves. Alternatively, the cylinder with the groove or grooves may be driven by an electrical motor and its associated cylinder with the ridge or ridges may be friction driven in turn by the cylinder with the groove or grooves.

The elongated members may be inclined from a charging to a discharge end.

The device may include vibrating means for vibrating the elongated members.

The products to be cleaned may be onions or any other suitable agricultural products requiring cleaning, and also may include any non-agricultural products, which may be suitably cleaned by means of the device.

BRIEF DESCRIPTION OF DRAWINGS

The invention will now be described by way of example with reference to the accompanying schematic drawings.

In drawings there is shown in:

FIG. 4 on a larger scale a pictorial view of a part of a pair of cylinders as illustrated in FIGS. 2 and 3.

DETAILED DESCRIPTION OF DRAWINGS

Figure 1:
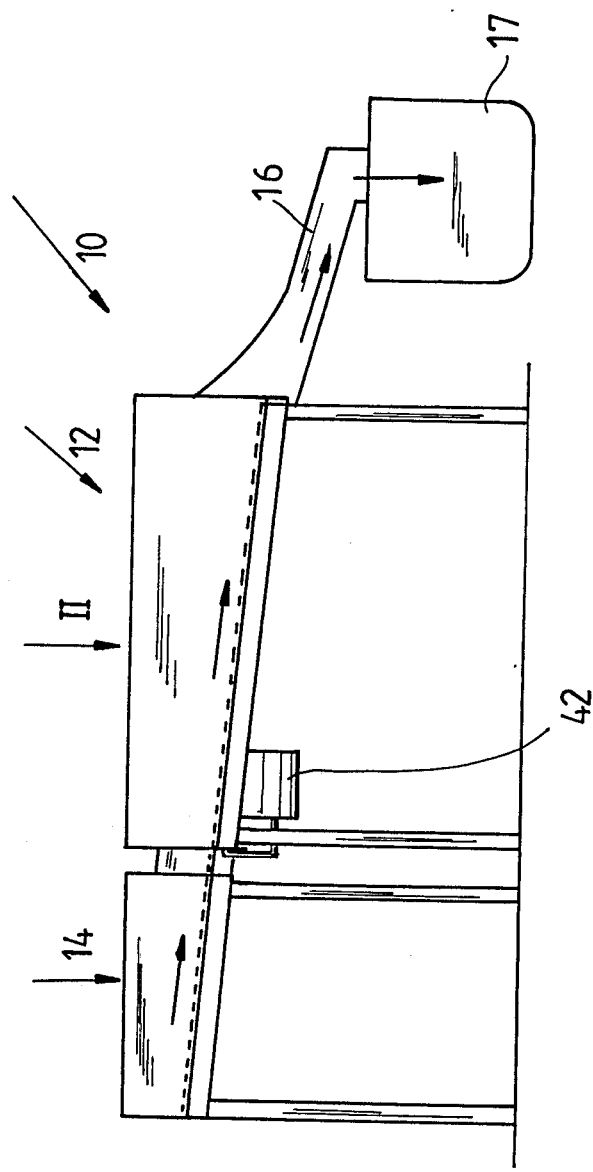
FIG. 1 a side view of a cleaning device for agricultural products in accordance with the invention.

Referring to FIG. 1, the cleaning device 10 for agricultural products (such as onions) includes a unit 12 provided with rotatable elongated members in the form of cylinders in accordance with the invention as will be explained hereinafter.

Upstream of the unit 12, a unit 14 including a bin or other suitable container for receiving agricultural products to be cleaned, is located.

The unit 14 may be provided with vibration means and a screen so as to allow impurities and loose parts to be separated from the products prior to moving to the unit 12.

From the unit 12 the cleaned products move along a discharge chute 16 for deposit into a bin or bag or other suitable container 17.

Figure 2:
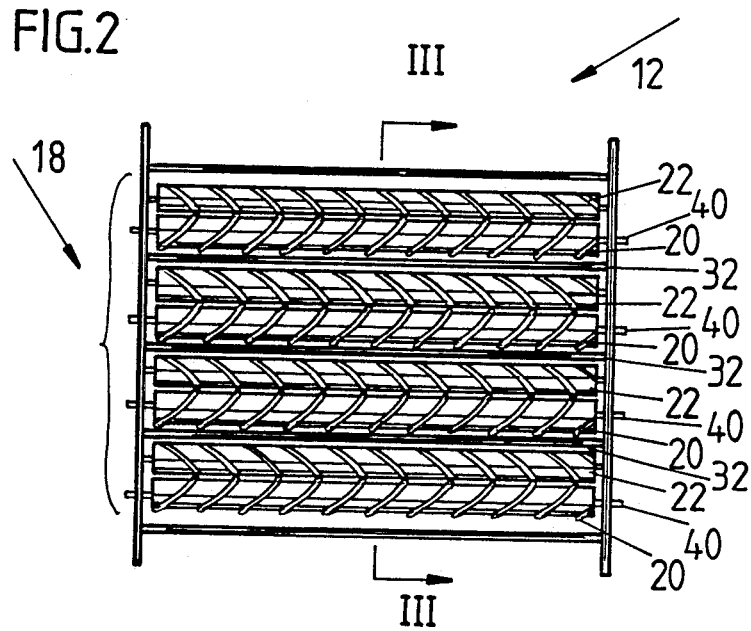
FIG. 2 a plan view of the part of the device provided with the cylinders in accordance with the invention and as seen along arrow II in FIG. 1.
Figure 3:
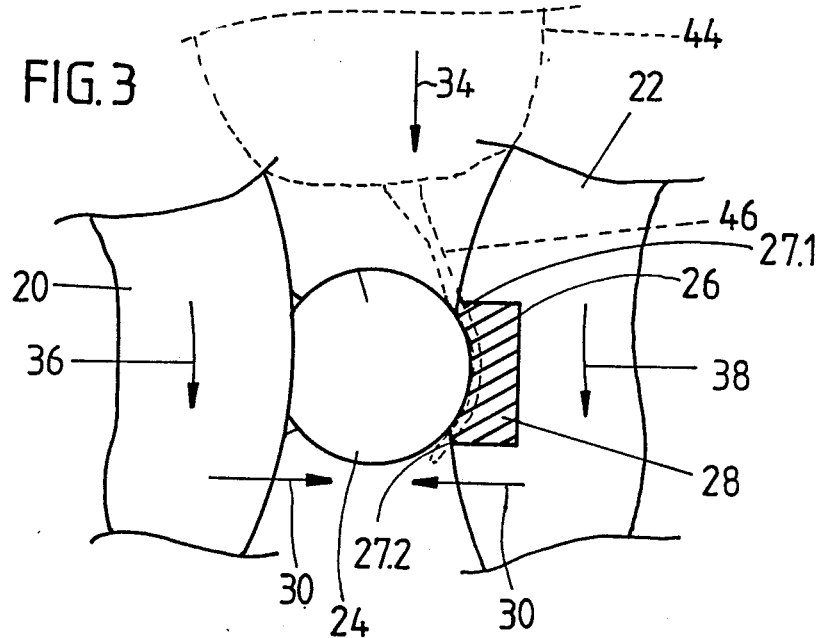
FIG. 3 on a larger scale, an end view showing the meshing between adjacent cylinders and as seen along arrows III—III in FIG. 2 but showing only one pair of rollers.

Referring to FIGS. 2 and 3, the cleaning unit 12 includes a group 18 of various pairs of associated cylinders 20 and 22. Each cylinder 20 is provided with at least one spiral ridge 24 connected thereto. The ridge 24 is adapted to penetrate partly into a complementary spiral groove 26 provided on the associated and adjacent cylinder 22. The spiral groove 26 is filled with a strip 28 of resilient material. As shown in FIG. 4, three spiral ridges 24.1, 24.2, 24.3 are provided on the cylinder 20 and three corresponding grooves 26.1, 26.2, 26.3 in the cylinder 22.

It must be noted that it is not essential to have a resilient strip 28 and it therefore may, if deemed necessary, be omitted.

The cylinders 20 and 22 are biased toward each other as indicated by arrows 30 in FIG. 3 (e.g. by having one cylinder floating and having spring biasing means, such as a spring acting by way of a force between the cylinders—details of which are not shown). However, if a larger article should move between the ridge 24 and the groove 26 (e.g. a stone or stick) then the cylinders 20 and 22 are designed to move relatively apart to form a gap sufficiently large so as to allow such articles to drop down.

The various pairs 20, 22 of the group of cylinders 18 are separated from each other by means of guides 32 located on either side of such pair.

Products to be cleaned will move downwardly from the supply unit 14 on to the cylinders 20, 22 in the cleaning unit 12 in the space indicated by reference numeral 34 between associated cylinders 20, 22 of each pair of cylinders. The cylinders 20, 22 are rotated in the direction shown by arrows 36, 38. Parts, which project from such products (e.g. in the case of onions loose skin layers, leaves or roots), will be gripped between a ridge 24 and the associated groove by being pressed against the resilient strip 28. Such projections will be pulled off or cut when the ridge 24 comes into contact with the sharp edges 27.1 and 27.2 of the groove 26. Thereby the products are cleaned prior to being discharged via the chute 16 for deposit into a container 17.

The cylinders 20 have shafts 40 which are all driven by means of an electrical motor 42 (see FIG. 1). Each cylinder 20 in turn frictionally or mechanically drives its associated cylinder 22 via the ridge 24 engaging in the groove 26.

In FIG. 3 part of an agricultural product, e.g. an onion, is shown in dotted lines 44. This product 44 has a skin or leaf 46 projecting away from the main body of the onion 44. The skin or leaf 46 is shown to have been gripped between the ridge 24 and the groove 26 (i.e. being pressed by the ridge 24 against the resilient strip 28) so that it is pulled off the main body of the onion 44.

I claim:

1. A cleaning device for agricultural products, which includes a support structure having an upper side and a lower side; at least one pair of rotatable elongated members arranged adjacent and substantially parallel to each other; rotating means for rotating each of the elongated members about its respective longitudinal axis so that in each pair the elongated members are rotated in opposite directions towards each other and towards the lower side of the support structure; at least one spiral ridge provided on one elongated member in each pair; a complementary associated spiral groove for each spiral ridge provided on an adjacent associated elongated member of each pair of elongated members, so that on rotation of the elongated members projecting parts of agricultural products to be cleaned and placed on the elongated members are gripped between associated spiral ridges and spiral grooves for removal from such products; and a strip made of resilient material being located in each spiral groove against which strip the complementary spiral ridge is adapted to abut.

2. A device as claimed in claim 1, in which the elongated members are in the form of elongated cylinders.

3. A device as claimed in claim 1, in which the rotating means includes an electrical motor adapted to drive the elongated members with the ridge in all pairs of elongated members and its associated cylinder with the groove in turn is friction driven by the cylinder with the ridge.

4. A device as claimed in claim 1, in which the elongated members are inclined from a charging to a discharge end.

* * * * *